J. D. FANGER.
FRONT CONSTRUCTION FOR BEET HARVESTERS.
APPLICATION FILED APR. 5, 1917.
1,266,439.
Patented May 14, 1918.
3 SHEETS—SHEET 1.
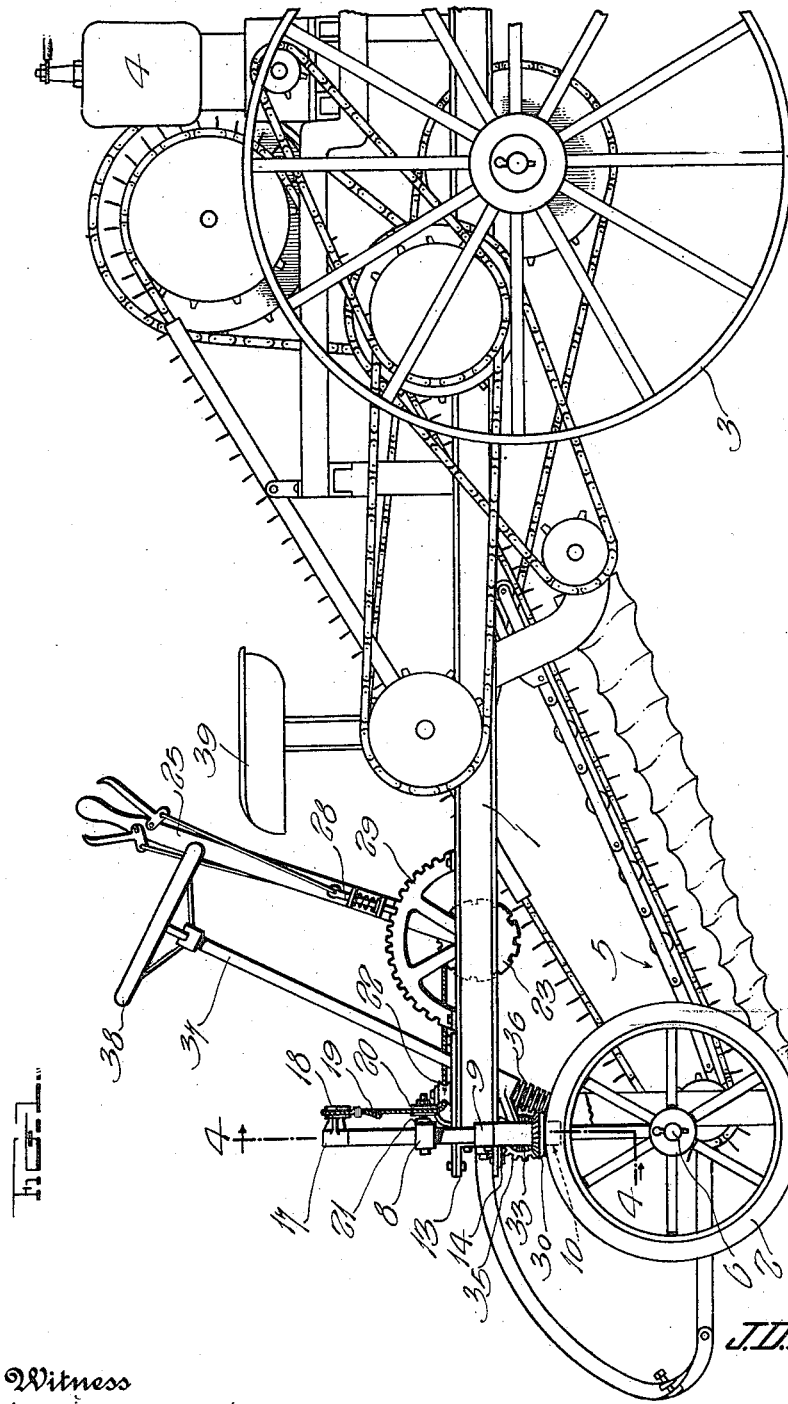
Witness
H. Woodard
Inventor
J.D. FANGER
By H.B. Willson & Co
Attorneys

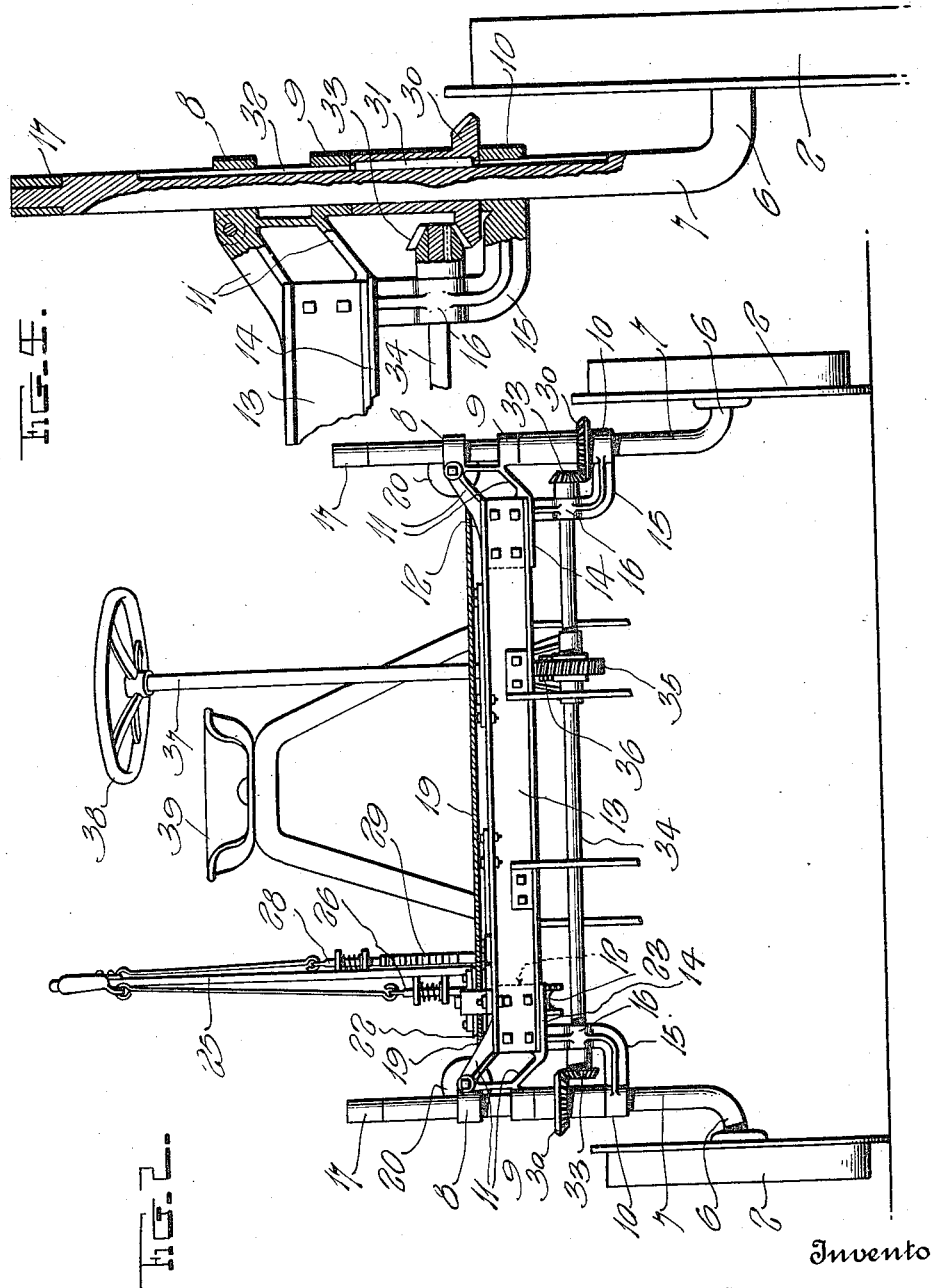

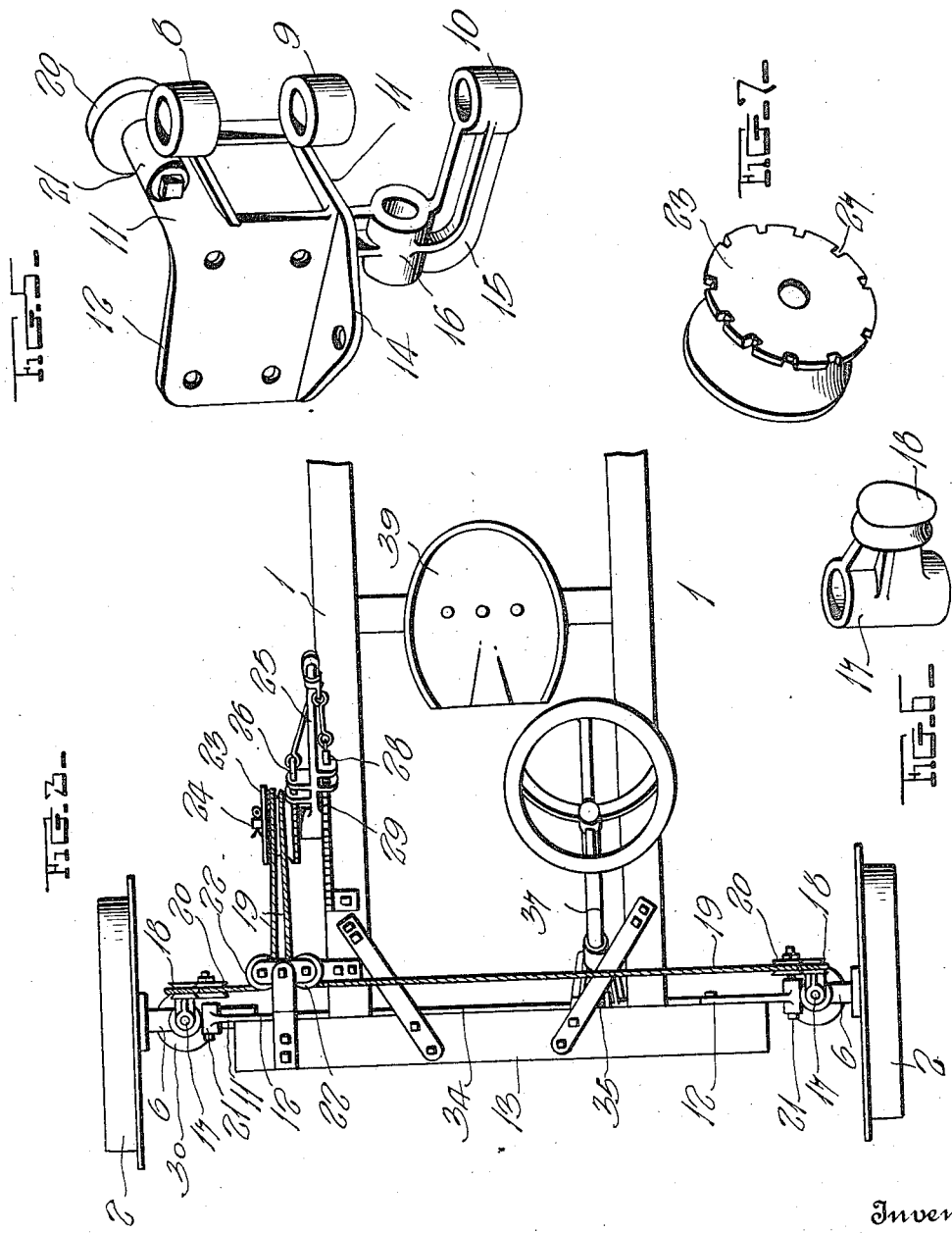

UNITED STATES PATENT OFFICE.

JOSEPH D. FANGER, OF TOLEDO, OHIO, ASSIGNOR TO THE FANGER BEET HARVESTER CO., OF TOLEDO, OHIO, A CORPORATION OF OHIO.

FRONT CONSTRUCTION FOR BEET-HARVESTERS.

1,266,439.   Specification of Letters Patent.   Patented May 14, 1918.

Application filed April 5, 1917. Serial No. 159,917.

*To all whom it may concern:*

Be it known that I, JOSEPH D. FANGER, a citizen of the United States, residing at Toledo, in the county of Lucas and State of Ohio, have invented certain new and useful Improvements in Front Constructions for Beet-Harvesters; and I do declare the following to be a full, clear, and exact description of the invention, such as will enable others skilled in the art to which it appertains to make and use the same.

My invention has for its object to improve upon the front construction of motor driven beet harvesting machines and the like to such an extent as to provide simple and efficient means whereby the frame of the machine may be raised and lowered at will without in any manner interfering with the steering thereof.

With the foregoing general object in view, the invention resides in certain novel features of construction and unique combinations of parts to be hereinafter fully described and claimed, the descriptive matter being supplemented by the accompanying drawings which constitute a part of this application and in which:

Figure 1 is a side elevation of a beet harvesting machine showing the improved features of construction;

Fig. 2 is a front elevation thereof;

Fig. 3 is a top plan view of the front end of the machine;

Fig. 4 is a vertical section on the plane of the line 4—4 of Fig. 1;

Fig. 5 is a perspective view of one of the brackets carrying the bearings in which the vertical standards of the front axles are mounted;

Fig. 6 is a perspective view of one of the sleeves which are swiveled on the upper ends of said standards;

Fig. 7 is a perspective view of the drum upon which the frame raising and lowering cables are wound.

In the drawings above briefly described, the numeral 1 has reference to a horizontal frame having front and rear wheels 2 and 3 respectively, said rear wheels being driven by any suitable connections from a motor 4 mounted preferably on the rear end of the frame. Beet digging and conveying means 5 is carried by the frame 1 but since this means and the manner of driving the wheels 3 form no part of the present invention, they are illustrated more or less in diagram.

The front wheels 2 are mounted on stub axles 6 from whose inner ends vertical cylindrical standards 7 rise, each of said standards being received in three vertically alined bearings 8, 9 and 10 carried by the frame, the bearings 8 and 9 being preferably formed integrally with arms 11 which incline upwardly and outwardly from bracket plates 12 bolted or otherwise secured to the projecting ends of the front end bar 13 of the frame 1, said plates preferably having ledges or flanges 14 upon which the ends of said bar rest, L-shaped arms 15 are formed integrally with and extend downwardly and outwardly from the bracket plates 12, the outer ends of said arms carrying the bearings 10 while the vertical portions thereof are formed with horizontally disposed bearings 16 for a purpose to be described.

Sleeves 17 are swiveled on the reduced upper ends of the standards 7 and are provided with rearwardly extending knobs 18 to which a pair of cables 19 are anchored, said cables extending downwardly beneath sheaves 20 which are carried by the upper arms 11 of the bracket plates 12, said arms being preferably reinforced at 21 to accommodate the stub axles upon which the sheaves 20 rotate. From the sheaves 20, the cables 19 extend inwardly and then pass rearwardly around other sheaves 22 mounted at one side of the frame 1, the rear ends of the cables being secured to a drum 23 mounted on a stub shaft 24 which extends outwardly from one side bar of the frame, a hand lever 25 being mounted for oscillation on the inner end of said shaft and having a dog 26 for engagement with any of the notches 27 to secure the lever and drum adjustably together, said notches being formed in the inner end of the drum as shown clearly in Fig. 7. Another dog 28 is carried by the lever 25 for coöperation with a segmental rack 29 carried by the frame 1 so that said lever may be held in any required position.

By the arrangement of parts above described, a rearward pull on lever 25 will wind the cables 19 on the drum 23 and will thus cause the entire frame to move upwardly, the bearings 8, 9 and 10 then sliding on the standards 7. Movement of the lever in question in a forward direction, will lower the frame as will be obvious.

For steering the machine, beveled gears 30 are mounted on the standards 7 between the bearings 9 and 10, said standards being free to slide through said gears, whereas relative rotation is prevented by keys 31 carried by said gears and sliding in keyways 32 formed longitudinally in the standards. Pinions 33 mesh with the gears 30 and are carried by the ends of a transverse shaft 34 which is rotatably mounted in the bearings 16 above described, said shaft being shown as provided with a worm gear 35 with which a worm 36 meshes. The worm 36 is carried on the lower end of a steering post 37 having a hand wheel 38 at its upper end positioned adjacent the driver's seat 39. This means of turning shaft 34 is preferable but it is obvious that the same results could be accomplished in other ways.

It will be observed by reference to Fig. 2 that the teeth of one gear 30 are on the lower side thereof whereas the upper side of the other gear is toothed. This is necessary in order that rotation of the two pinions 33 in the same direction may turn the standards 7 as required.

Due to the steering means above described vertical adjustment of the frame is permitted yet said means will be effective regardless of the elevation at which said frame is set. The particular arrangement of parts shown and described constitute the preferred form of the steering and adjusting means since the best results are obtained thereby but it is to be understood that within the scope of the invention as claimed, numerous changes may be made without sacrificing the principal advantages.

I claim:

1. In a portable machine, the combination of a frame supported on wheels at its rear end and having upper and lower vertically alined bearings at its front corners, vertical standards upon which said bearings are slidable, said standards being free to turn in said bearings, front wheels rotatably mounted on the lower end of said standards, wheels through which said standards pass slidably but non-rotatably, said wheels being mounted between said upper and lower bearings, means for turning said second-named wheels to guide the machine, and means for moving the frame vertically in respect to said standards.

2. In a portable machine, the combination of a frame supported on wheels at its rear end and having upper and lower vertically alined bearings at its front corners, vertical standards upon which said bearings are slidable, said standards being free to turn in said bearings, front wheels rotatably mounted on the lower ends of said standards, wheels through which said standards pass slidably but non-rotatably, said wheels being mounted between said upper and lower bearings, means for turning said second-named wheels to guide the machine, means for moving the frame vertically in respect to said standards, said means including a pair of anchors swiveled on the upper ends of said standards, cables secured to said anchors, sheaves on the frame over which said cables pass, and a drum on said frame upon which said cables are wound.

3. In a portable machine, the combination of a frame mounted on wheels at its rear end and having at its front end a transverse bar projecting beyond the sides of the frame, bracket plates extending vertically and secured to the ends of said bar, upper and lower arms formed integrally with and projecting from said bracket plates beyond the ends of said bar, L-shaped arms depending one from each of said bracket plates, vertically alined bearings carried by the outer ends of the several arms and horizontal bearings carried by the inner portions of said L-shaped arms, vertical standards received slidably and rotatably in said vertically alined bearings, front wheels mounted on the lower ends of said standards, wheels slidably but non-rotatably received on said standards and positioned between the lowermost of said vertically alined bearings and those immediately above the same, a horizontal steering shaft rotatably mounted in said horizontal bearings and operatively connected with said second-mentioned wheels for turning the same, means for rotating said steering shaft, and means for adjusting the frame vertically in respect to said standards.

In testimony whereof I have hereunto set my hand in the presence of two subscribing witnesses.

JOSEPH D. FANGER.

Witnesses:
HARRY LEVISON,
MARY SKEFFINGTON.